United States Patent
Sokolov et al.

(10) Patent No.: US 10,492,072 B1
(45) Date of Patent: Nov. 26, 2019

(54) SYSTEMS AND METHODS FOR EVALUATING WIRELESS NETWORK CONNECTION SECURITY

(71) Applicant: Symantec Corporation, Mountain View, CA (US)

(72) Inventors: Ilya Sokolov, Boston, MA (US); Gopi Bhagavathula, Mountain View, CA (US); Ning Chai, Mountain View, CA (US); Keith Newstadt, Newton, MA (US)

(73) Assignee: Symantec Corporation, Mountain View, CA (US)

( * ) Notice: Subject to any disclaimer, the term of this patent is extended or adjusted under 35 U.S.C. 154(b) by 14 days.

(21) Appl. No.: 15/389,094

(22) Filed: Dec. 22, 2016

(51) Int. Cl.
*H01L 29/08* (2006.01)
*H04W 4/06* (2009.01)
*H04W 12/08* (2009.01)
*H04L 29/08* (2006.01)
*H04L 29/12* (2006.01)
*H04W 88/12* (2009.01)

(52) U.S. Cl.
CPC ......... *H04W 12/08* (2013.01); *H04L 61/6022* (2013.01); *H04L 67/12* (2013.01); *H04W 88/12* (2013.01)

(58) Field of Classification Search
CPC ............. H04L 63/1408; H04L 63/1425; H04L 63/1416; H04L 63/123; H04L 63/1433; H04L 63/029; H04L 63/0435; H04L 63/1441; H04L 63/145; H04L 9/3234; H04L 9/3268; H04L 12/2803; H04W 12/06; H04W 4/70
See application file for complete search history.

(56) References Cited

U.S. PATENT DOCUMENTS

| | | | | |
|---|---|---|---|---|
| 2013/0122851 | A1* | 5/2013 | Michaelis | H04W 4/90 455/404.2 |
| 2014/0327936 | A1* | 11/2014 | Busch | G06F 3/1292 358/1.15 |
| 2015/0229543 | A1* | 8/2015 | Scaff et al. | H04L 43/04 |
| 2016/0323322 | A1* | 11/2016 | Shimizu | H04L 63/205 |
| 2016/0381143 | A1* | 12/2016 | Malik | H04L 67/125 455/518 |
| 2017/0063823 | A1* | 3/2017 | Cheng | H04W 76/10 |
| 2017/0187642 | A1* | 6/2017 | Nolan | H04W 4/70 |
| 2017/0347264 | A1* | 11/2017 | Holland | H04W 12/06 |

* cited by examiner

*Primary Examiner* — Gary Lafontant
(74) *Attorney, Agent, or Firm* — FisherBroyles, LLP

(57) ABSTRACT

The disclosed computer-implemented method for evaluating wireless network connection security may include (i) detecting a wireless network connection from an Internet-of-Things device through sniffing, (ii) automatically selecting the wireless network connection as the wireless network connection to be evaluated in an analysis of network connection security, (iii) performing, in response to the automatic selecting of the wireless network connection as the wireless network connection to be evaluated, the analysis of network connection security to determine whether the wireless network connection is secure, and (iv) automatically reporting, through a physical output of the computing device and in response to performing the analysis of network connection security, a result of the analysis of network connection security to inform a user about the safety of the Internet-of-Things device. Various other methods, systems, and computer-readable media are also disclosed.

20 Claims, 7 Drawing Sheets

SYSTEMS AND METHODS FOR EVALUATING WIRELESS NETWORK CONNECTION SECURITY

BACKGROUND

Internet-of-Things devices, such as Internet-aware refrigerators, thermostats, scales, cameras, and physical security systems, are often found in modern homes. Additionally, the state of security in embedded devices and Internet-of-Things devices may be relatively poor, and consumers may not trust these devices on home networks.

Some enterprise solutions attempt to solve these problems by using an enterprise-level smart firewall. The firewall may identify network nodes that communicate through an unsecure channel. Unfortunately, direct application of these solutions in the consumer space (e.g., at the location of a home wireless router) may be complicated and impractical. For example, a technologically non-savvy user may find it difficult to understand that a specific Internet Protocol address or a specific MAC address is communicating through an unsecure channel. In view of the above, the instant disclosure identifies and addresses a need for systems and methods for evaluating wireless network connection security.

SUMMARY

As will be described in greater detail below, the instant disclosure describes various systems and methods for evaluating wireless network connection security. In one example, a computer-implemented method for evaluating wireless network connection security may include (i) detecting a wireless network connection from an Internet-of-Things device through sniffing, (ii) automatically selecting the wireless network connection as the wireless network connection to be evaluated in an analysis of network connection security by at least one of comparing a signal strength of the wireless network connection with an expected signal strength and comparing the signal strength of the wireless network connection to a signal strength of another detected wireless network connection, (iii) performing, in response to the automatic selecting of the wireless network connection as the wireless network connection to be evaluated, the analysis of network connection security to determine whether the wireless network connection is secure, and (iv) automatically reporting, through a physical output of the computing device and in response to performing the analysis of network connection security, a result of the analysis of network connection security to inform a user about the safety of the Internet-of-Things device.

In one embodiment, the Internet-of-Things device may include (i) a refrigerator, (ii) a thermostat, (iii) a scale, (iv) a camera, and/or (v) a household security system. In further embodiments, automatically selecting the wireless network connection as the wireless network connection to be evaluated in an analysis of network connection security is performed while the computing device is affixed to the Internet-of-Things device.

In one embodiment, automatically selecting the wireless network connection as the wireless network connection to be evaluated in the analysis of network connection security may include comparing the signal strength of the wireless network connection with the expected signal strength. In further embodiments, automatically selecting the wireless network connection as the wireless network connection to be evaluated in the analysis of network connection security may include comparing the signal strength of the wireless network connection to a signal strength of the other detected wireless network connection.

In some examples, comparing the signal strength of the wireless network connection to the signal strength of the other detected wireless network connection may include determining that the signal strength of the wireless network connection is stronger. In some examples, determining that the signal strength of the wireless network connection is stronger may include determining that the signal strength is strongest among a set of all detected wireless network connections.

In some examples, performing the analysis of network connection security to determine whether the wireless network connection is secure may include (i) determining whether the wireless network connection uses an unencrypted channel, (ii) determining whether the wireless network connection uses an encrypted channel that is encrypted according to a network protocol that had been previously categorized, at the computing device, as weak encryption, (iii) determining whether the wireless network connection uses a security certificate that is at least one of expired and self-signed, and/or (iv) determining whether entropy on the wireless network connection has been validated.

In one embodiment, relative movement between the computing device and the Internet-of-Things device triggers the automatic selecting of the wireless network connection as the wireless network connection to be evaluated in the analysis of network connection security. In further embodiments, the computing device corresponds to a thumb-sized device with minimal functionality that is substantially limited to the analysis of network connection security and the physical output of the computing device visually displays a color to indicate a level of security for the wireless network connection.

In one embodiment, a system for implementing the above-described method may include (i) a detection module, stored in memory, that detects a wireless network connection from an Internet-of-Things device through sniffing, (ii) a selection module, stored in memory, that automatically selects the wireless network connection as the wireless network connection to be evaluated in an analysis of network connection security by at least one of comparing a signal strength of the wireless network connection with an expected signal strength and comparing the signal strength of the wireless network connection to a signal strength of another detected wireless network connection, (iii) a performance module, stored in memory, that performs, in response to the automatic selecting of the wireless network connection as the wireless network connection to be evaluated, the analysis of network connection security to determine whether the wireless network connection is secure, (iv) a reporting module, stored in memory, that automatically reports, through a physical output of the computing device and in response to performing the analysis of network connection security, a result of the analysis of network connection security to inform a user about the safety of the Internet-of-Things device, and (v) at least one physical processor configured to execute the detection module, the selection module, the performance module, and the reporting module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detect a wireless network connection from an Internet-of-Things device through sniffing, (ii) automatically select the wireless network connection as the wireless network connection to be evaluated in an analysis of network connection security by at least one of comparing a signal strength of the wireless network connection with an expected signal strength and comparing the signal strength of the wireless network connection to a signal strength of another detected wireless network connection, (iii) perform, in response to the automatic selecting of the wireless network connection as the wireless network connection to be evaluated, the analysis of network connection security to determine whether the wireless network connection is secure, and (iv) automatically report, through a physical output of the computing device and in response to performing the analysis of network connection security, a result of the analysis of network connection security to inform a user about the safety of the Internet-of-Things device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
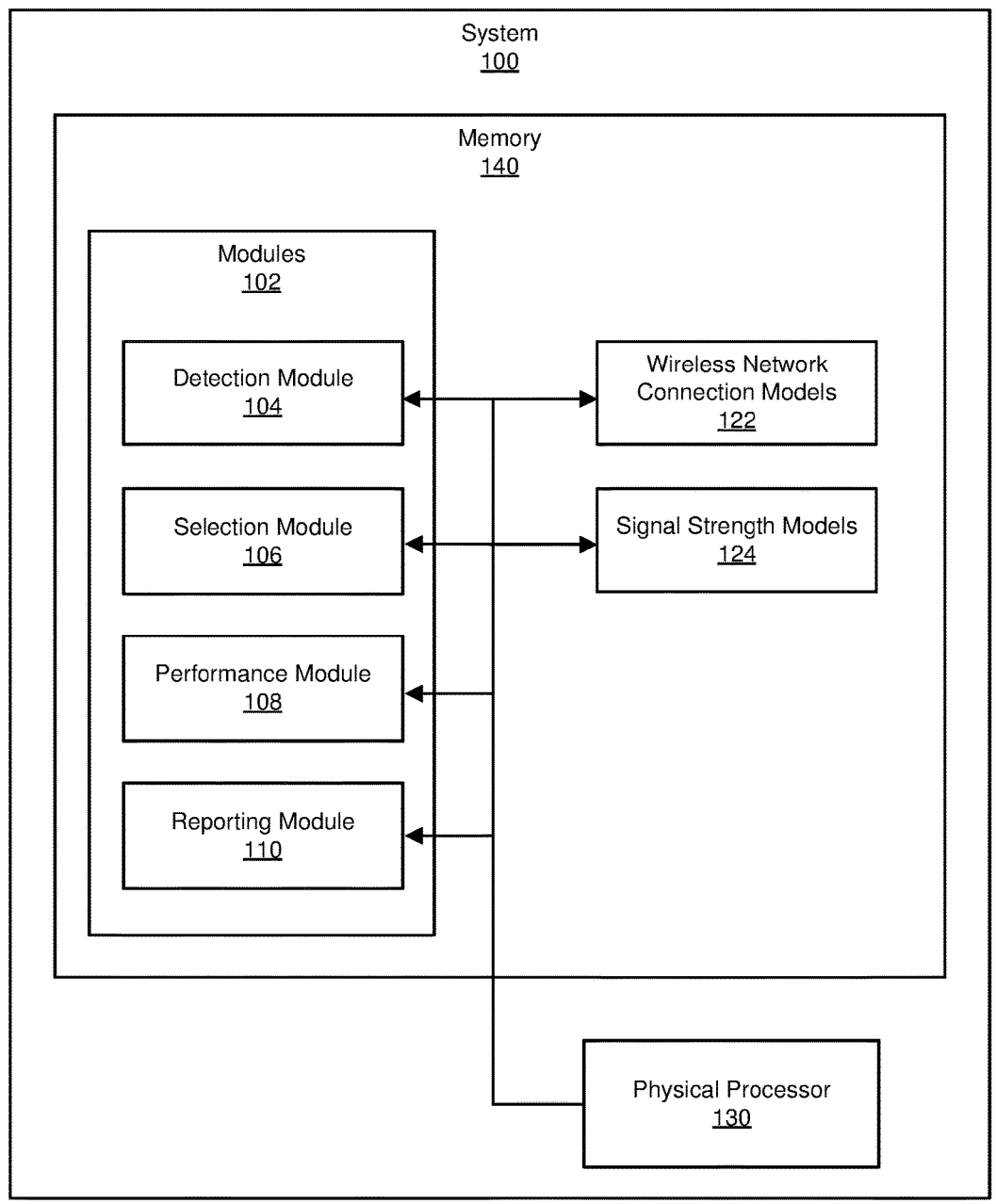
FIG. 1 is a block diagram of an example system for evaluating wireless network connection security.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for evaluating wireless network connection security. As will be described further below, the disclosed systems and methods may effectively streamline, automate, and/or render more convenient a technique for evaluating the security of a wireless network connection between an embedded device or an Internet-of-Things device. More specifically, the disclosed techniques may select a wireless network connection automatically on the basis of proximity and/or wireless network connection signal strength. Basing the selection decision on the proximity and/or wireless network connection signal strength for the Internet-of-Things device may effectively eliminate a complicated and/or cumbersome process for configuring a smart phone or other device to evaluate the security of the corresponding wireless network connection.

For example, in one embodiment, a user may simply affix a thumb-sized and/or handheld device (e.g., a wireless network connection monitoring device), with minimal input/output functionality, to the Internet-of-things device, or other wirelessly connected device, and the wireless network connection monitoring device may automatically select the corresponding wireless network connection, automatically evaluate the security of the wireless network connection, and automatically report or output a result of the evaluation, thereby informing the user about potential safety or danger of the wireless network connection. In some examples, the entire process of automatically identifying and selecting the wireless network connection, evaluating the wireless network connection, and reporting the results of the evaluation, may be performed in an automated and streamlined manner such that a user may affix the wireless network connection monitoring device to the Internet-of-Things device and receive a visual or other indication of the safety of the corresponding wireless network connection nearly instantaneously and/or without further user input or configuration. The wireless network connection monitoring device may also perform one or more security actions to address detected security risks, as discussed further below. Additionally, in some examples, the streamlined, user-friendly, automated, and convenient technique for evaluating the security of a wireless network connection may be performed on a smart phone, laptop, and/or comparable computing device.

Figure 2:
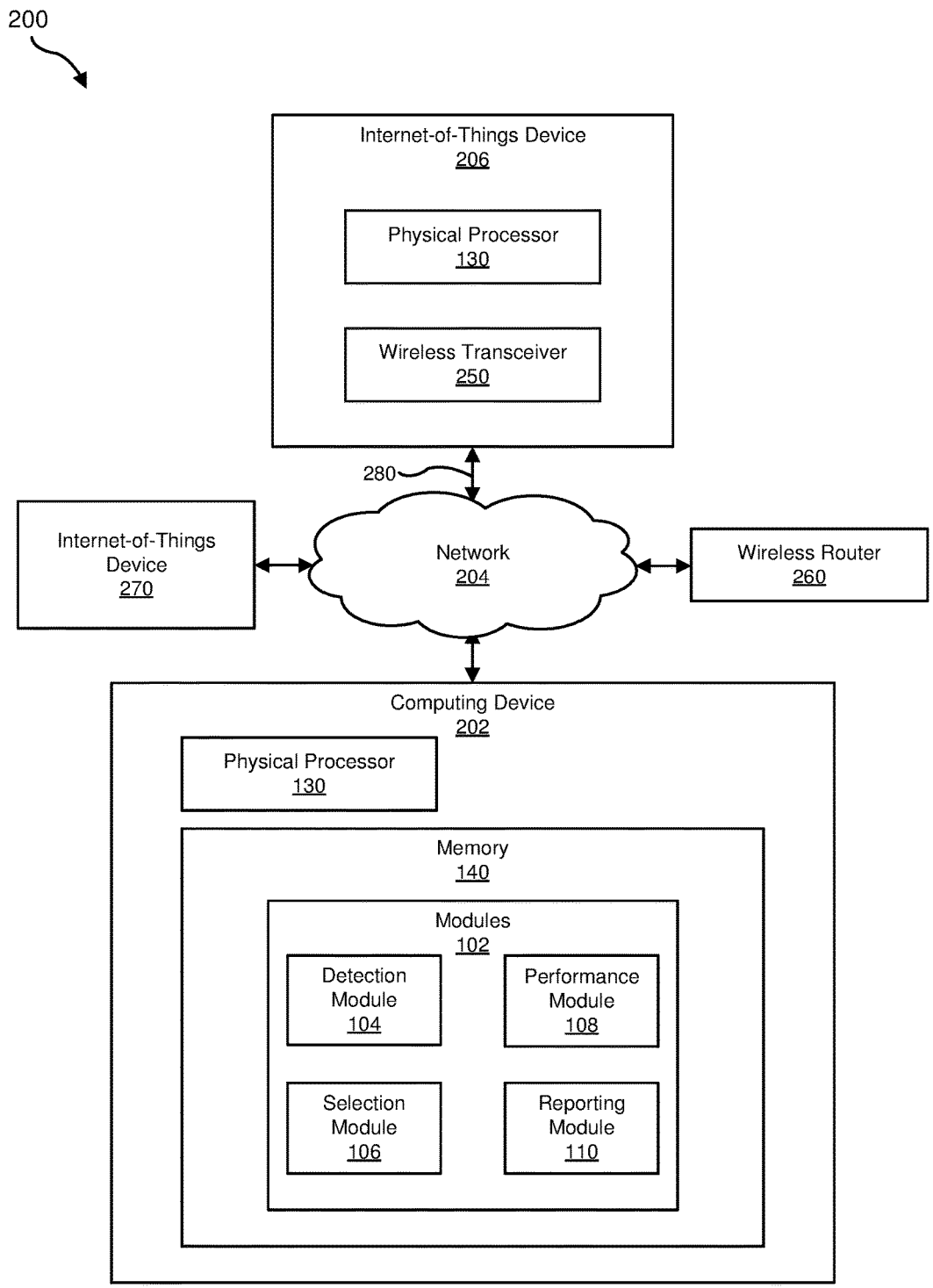
FIG. 2 is a block diagram of an additional example system for evaluating wireless network connection security.

The following will provide, with reference to FIGS. 1-2, detailed descriptions of example systems for evaluating wireless network connection security. Detailed descriptions of corresponding computer-implemented methods will also be provided in connection with FIGS. 3-5. In addition, detailed descriptions of an example computing system and network architecture capable of implementing one or more of the embodiments described herein will be provided in connection with FIGS. 6 and 7, respectively.

FIG. 1 is a block diagram of example system 100 for evaluating wireless network connection security. As illustrated in this figure, example system 100 may include one or more modules 102 for performing one or more tasks. For example, and as will be explained in greater detail below, example system 100 may include a detection module 104 that detects a wireless network connection from an Internet-of-Things device through sniffing. Example system 100 may additionally include a selection module 106 that automatically selects the wireless network connection as the wireless network connection to be evaluated in an analysis of network connection security by at least one of comparing a signal strength of the wireless network connection with an expected signal strength and comparing the signal strength of the wireless network connection to a signal strength of another detected wireless network connection.

Furthermore, system 100 may include a performance module 108 that performs, in response to the automatic selecting of the wireless network connection as the wireless network connection to be evaluated, the analysis of network connection security to determine whether the wireless network connection is secure. Additionally, system 100 may include a reporting module 110 that automatically reports, through a physical output of the computing device and in response to performing the analysis of network connection security, a result of the analysis of network connection security to inform a user about the safety of the Internet-of-Things device. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or Internet-of-things device 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As further shown in FIG. 1, memory 140 may also store wireless network connection models 122, which may correspond to data structures with information describing wireless network connections between a wireless router and one or more Internet-of-Things devices, as described further below. Additionally, memory 140 may also store signal strength models 124, which may correspond to data structures with information describing the signal strength of detected wireless network connections, as well as profiles describing expected signal strengths of specific device models and brands, as is also discussed further below.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate evaluating wireless network connection security. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with an Internet-of-things device 206 via a network 204. In one example, all or a portion of the functionality of modules 102 may be performed by computing device 202, Internet-of-things device 206, and/or any other suitable computing system. As will be described in greater detail below, one or more of modules 102 from FIG. 1 may, when executed by at least one processor of computing device 202, enable computing device 202 to evaluate wireless network connection security. For example, and as will be described in greater detail below, detection module 104 may detect a wireless network connection 280, over network 204, from Internet-of-Things device 206 through sniffing (e.g., between Internet-of-Things device 206 and a wireless router 260). In some examples, detection module 104 may also detect a wireless network connection between Internet-of-things device 270 and a wireless router 260. Selection module 106 may automatically select wireless network connection 280 as the wireless network connection to be evaluated in an analysis of network connection security. Selection module 106 may perform the selection by at least one of comparing a signal strength of wireless network connection 280 with an expected signal strength and comparing the signal strength of wireless network connection 280 to a signal strength of another detected wireless network connection, such as the wireless network connection between Internet-of-Things device 270 and wireless router 260.

Additionally, performance module 108 may perform, in response to the automatic selecting of wireless network connection 280 as the wireless network connection to be evaluated, the analysis of network connection security to determine whether wireless network connection 280 is secure. Furthermore, reporting module 110 may automatically report, through a physical output of computing device 202 and in response to performing the analysis of network connection security, a result of the analysis of network connection security to inform a user about the safety of Internet-of-Things device 206. In some examples, the physical output may correspond to a display screen, audio output, and/or an LED or other light indicating a color that corresponds to a determined level of safety or security risk, as discussed further below. Notably, as further shown in this figure, Internet-of-Things device 206 may also include a wireless transceiver 250.

Computing device 202 generally represents any type or form of computing device capable of reading computer-executable instructions. In some embodiments, computing device 202 may correspond to a relatively thumb-sized and/or handheld device that optionally may include a minimum subset of user-friendly functionality for evaluating the security of a wireless network device in an automated and streamlined manner, as further described above. Additionally, computing device 202 may correspond to a smart phone, laptop, and/or a comparable device. Additional examples of computing device 202 include, without limitation, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

More generally, the computing device 202 may, in some examples, correspond to a thumb-sized device with minimal functionality that is substantially limited to the analysis of network connection security in accordance with method 300, which is discussed further below. Optionally, in these examples, the physical output of the computing device visually displays a color to indicate a level of security for the wireless network connection, as is also further discussed below in connection with step 308 of method 300.

Internet-of-things device 206 generally represents any household or other appliance with a specific design functionality beyond general purpose computing that has been Internet enabled through wireless networking, as described further below.

Network 204 generally represents any medium or architecture capable of facilitating communication or data transfer. In one example, network 204 may facilitate communication between computing device 202 and Internet-of-things device 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
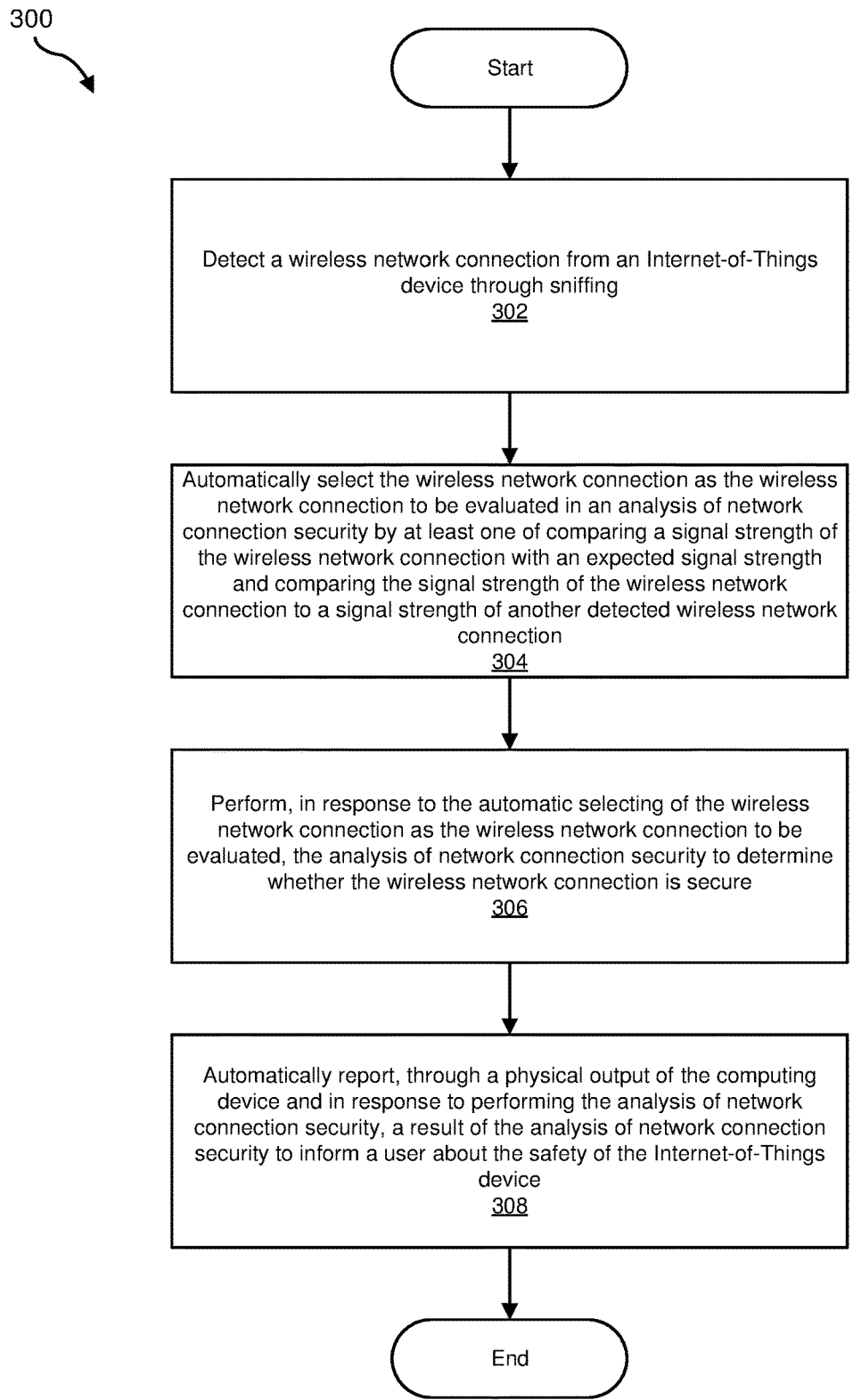
FIG. 3 is a flow diagram of an example method for evaluating wireless network connection security.

FIG. 3 is a flow diagram of an example computer-implemented method 300 for evaluating wireless network connection security. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may detect a wireless network connection from an Internet-of-Things device through sniffing. For example, detection module 104 may, as part of computing device 202 in FIG. 2, detect wireless network connection from Internet-of-Things device 206 through sniffing.

As used herein, the term "Internet-of-Things" generally refers to a household or other appliance with hardware having a primary and specific design functionality beyond general purpose and network computing and that has been Internet enabled through wireless networking. Examples of these devices include a smart refrigerator, which has the specific design functionality of cooling food, a smart weight scale, which has the specific design functionality of measuring and indicating what a person's weight is, and a smart home security system, which has a specific design functionality of protecting a person's home from intruders and other security risks.

Additionally, a smart phone, as used herein, corresponds to a "Internet-of-Things" device, because the smart phone has hardware with a primary and specific design functionality for making telephone calls, as in conventional cell phones or other phones, but has also been Internet enabled through wireless networking. In contrast, a laptop, desktop computer, workstation computer, server, and/or router generally do not correspond to Internet-of-Things devices, as used herein, because the primary specific design purposes of these is general-purpose and network computing rather than a preexisting, household appliance, and/or other design purpose beyond general purpose or network computing. In other words, these other devices do not correspond to "things" or appliances (e.g., primarily preexisting household appliances) to which the Internet has been added through wireless networking, as those terms are used herein.

As used herein, the phrase "sniffing" generally refers to inspecting wireless network packets that are transmitted by another wireless device, thereby enabling (in some examples) an analysis or evaluation of a corresponding wireless network connection that the transmitting device has established or is attempting to establish. In general, sniffing a wireless network connection does not necessarily involve the sniffing device establishing a wireless network connection to either a source address or destination address of the wireless network connection that is being sniffed. In alternative embodiments, the sniffing device, such as computing device 202, may sniff transmitted network packets even when the transmitting device, such as Internet-of-Things device 206, has not yet established a wireless network connection and/or is not attempting to establish a wireless network connection but is simply broadcasting network packets for some reason.

Figure 4:
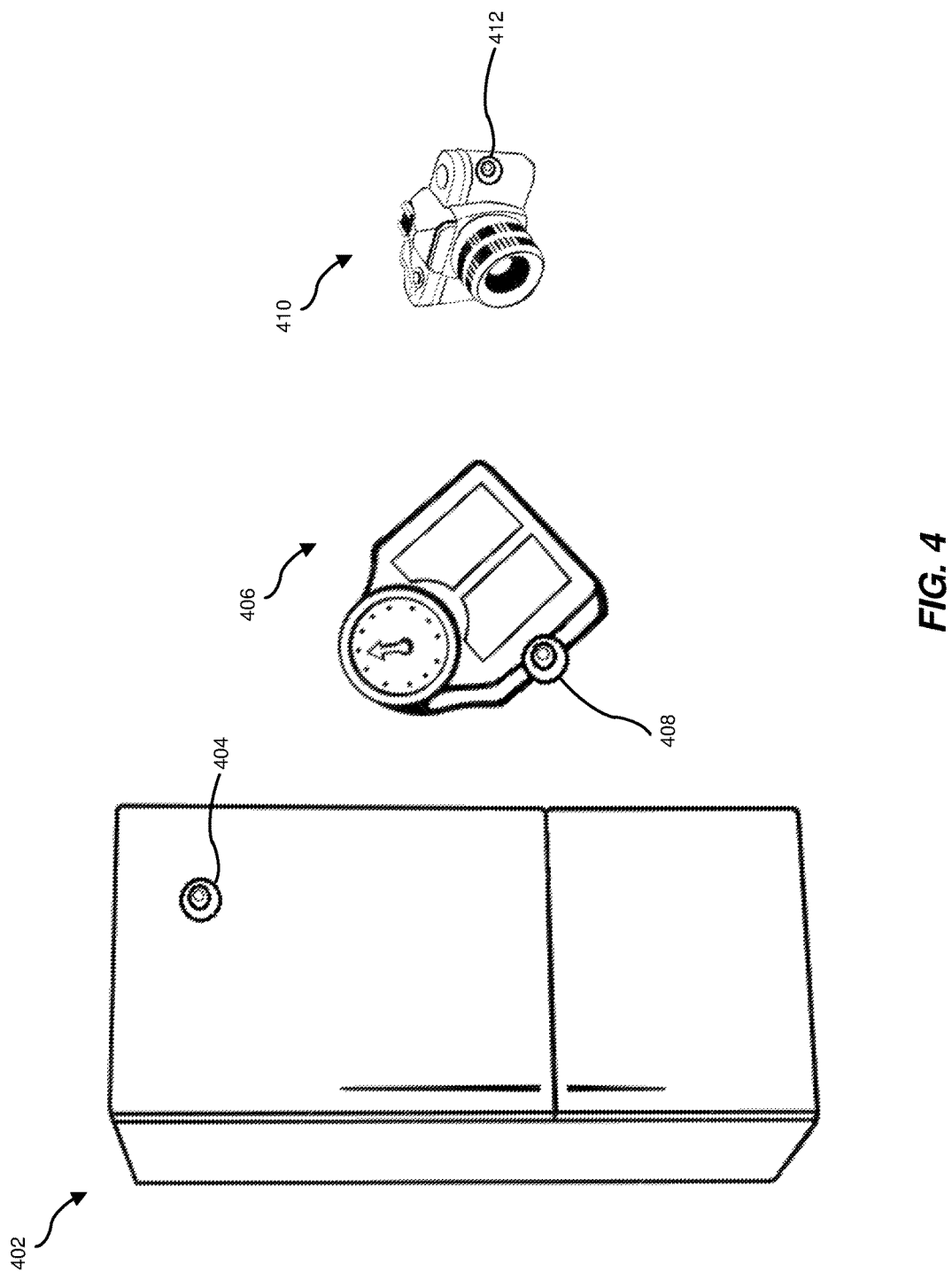
FIG. 4 is a block diagram of example Internet-of-Things devices to which a network connection monitoring device is attached, respectively.

Detection module 104 may detect the wireless network connection in a variety of ways. FIG. 4 shows examples of Internet-of-Things device 206. More specifically, FIG. 4 shows a smart refrigerator 402, a smart weight scale 406, and a smart digital camera 410. Additionally, FIG. 4 further shows that a user has affixed a network connection monitoring device 404, a network connection monitoring device 408, and a network connection monitoring device 412 to each of these, respectively. In these examples, the network connection monitoring device may correspond to computing device 202. Accordingly, detection module 104, within the network connection monitoring device, may detect the corresponding wireless network connection that each of the smart devices has established between a home router, such as wireless router 260 in FIG. 2.

Notably, detection module 104 may generally detect a multitude of wireless network connections, such as by detecting all wireless network connections that are within range of a wireless radio or antenna corresponding to detection module 104. For example, detection module 104 may detect the wireless network connections from Internet-of-Things device 206 and Internet-of-Things device 270 to wireless router 260, respectively. Similarly, in the example of FIG. 4, detection module 104 may detect wireless network connections from smart refrigerator 402, smart weight scale 406, and smart digital camera 410 the corresponding home router, such as wireless router 260, as described above.

In general, the network connection monitoring device may optionally include various features, in terms of thinness or minimal functionality, to render the device more streamlined, convenient, and/or user-friendly, especially with respect to non-expert users who may be unfamiliar with network computing technology and/or who may find it difficult to manually setting up complicated or cumbersome network configurations. For example, the network connection monitoring device may be of miniature size. The network connection monitoring device may be (e.g., about or substantially) thumb-sized, thumb-drive sized, and/or handheld. The network connection monitoring device may have a limited input and/or output. For example, the network connection monitoring device may only accept audio voice communication input. Additionally or alternatively, the network connection monitoring device may only include a single button or touchpad. In terms of output, the network connection monitoring device may only include a single light, such as an LED light, that may indicate a measured level of safety in terms of color (e.g., red is unsafe and green is safe). In other examples, the network connection monitoring device may include a single display, and the overall device may be configured to output a symbol or color that designates a measured level of safety, as further described above.

In general, the thinness, size, and/or minimal design of the network connection monitoring device may be configured to enable a non-expert user to quickly and conveniently carry the device toward an Internet-of-Things device, Internet-enabled device, or other appliance. The user may simply affix the network connection monitoring device to the other device, or simply place the network connection monitoring device closer to the other device, and in response the network connection monitoring device may quickly and seamlessly evaluate the security of the corresponding network connection and indicate a result of the evaluation, such as displaying a symbol or color. The symbol or color may change with relative movement between the network connection monitoring device and other devices, which may trigger a change or switch in the network connection under evaluation (e.g., as the movement causes one device under evaluation to be closer, and therefore have a stronger signal strength, than another device that was previously under evaluation). The symbol or color may also change as the same network connection switches from a secure to an unsecure state, or vice versa. In general, the network connection monitoring device may perform the monitoring and reporting in a seamless, continuous, synchronous, periodic, asynchronous, and/or scheduled manner, as appropriate.

In one embodiment, the Internet-of-Things device may include at least one of: (i) a refrigerator, (ii) a thermostat, (iii) a scale, (iv) a camera, and/or (v) a household security system. In other examples, the Internet-of-Things device may include any other pre-existing, traditional, and/or conventional household appliance that has been updated or embedded with wireless Internet connectivity, as further described above. In even further examples, the Internet-of-Things device may include a relatively new device, or a previously non-existing device, such as a voice-enabled search engine or remote control, with a minimalist design, which is Internet-enabled, but which does not have a primary hardware design function of general purpose computing or network computing, as further described above (i.e., because it has the narrower primary hardware design function of functioning as a remote control and providing search engine or artificial intelligence answers through a minimalist voice communication interface).

Returning to FIG. 3, at step 304, one or more of the systems described herein may automatically select the wireless network connection as the wireless network connection to be evaluated in an analysis of network connection security by at least one of comparing a signal strength of the wireless network connection with an expected signal strength and comparing the signal strength of the wireless network connection to a signal strength of another detected wireless network connection. For example, selection module 106 may perform the selection by at least one of comparing a signal strength of wireless network connection 280 with an expected signal strength and comparing the signal strength of wireless network connection 280 to a signal strength of another detected wireless network connection, such as the wireless network connection between Internet-of-Things device 270 and wireless router 260.

In general, as used herein, the phrase "select the wireless network connection" generally refers to confirming that the wireless network connection is the wireless network connection for which the corresponding security analysis and analysis result reporting will be performed. In other words, selection of the wireless network connection indicates that the wireless network connection will actually be evaluated and reported on, rather than passed over or ignored (e.g., at least at the point of time of the selection decision), either because the signal strength does not match or satisfy a policy in terms of an expected signal strength and/or in terms of the signal strength of one or more other detected wireless network connections within range of the corresponding wireless radio or antenna (e.g., because the selected wireless network connection has a signal strength that is stronger than another detected wireless network connection, thereby indicating that the selected wireless network connection is presumably closer and, therefore, is the user's intended target for security analysis and reporting). Even more generally, relative movement between the computing device, such as the network connection monitoring device, and the Internet-of-Things device (i.e., by moving one or both devices relative to each other) triggers the automatic selecting of the wireless network connection as the wireless network connection to be evaluated in the analysis of network connection security, as further discussed above.

Additionally, the term "automatically" generally refers to selection module 106 performing the selection in accordance with the network connection monitoring device having been put into an "on" or monitoring mode, which monitors wireless network connections continuously, synchronously, autonomously, periodically, randomly, and/or according to any other predefined schedule, as distinct from selection module 106 performing the selection in response to a user manually providing an instruction for selection or a selection decision, at the time of the selection decision, such as by selecting a button or giving a voice command.

In one illustrative embodiment, selection module 106 automatically performs the selection in response to the wireless network connection coming in range of the network connection monitoring device, either through moving or enabling the network connection monitoring device, or through moving or enabling the Internet-of-Things device that corresponds to the selected wireless network connection. For example, as a user moves around a household, carrying the network connection monitoring device, the user may consequently bring the network connection monitoring device closer to different appliances, such that the closest appliance to the network connection monitoring device switches at various points as the user moves around the household (e.g., and optionally affixes the network connection monitoring device to various appliances). Each time there is a switch in the closest appliance to the network connection monitoring device, selection module 106 may automatically select the corresponding wireless network connection for evaluation and reporting in accordance with method 300, as further described above and below.

Selection module 106 may automatically select the wireless network connection in a variety of ways. In one embodiment, automatically selecting the wireless network connection as the wireless network connection to be evaluated in an analysis of network connection security is performed while the computing device is affixed to the Internet-of-Things device. FIG. 4 illustrates three examples of the computing device, such as a network connection monitoring device described above, being affixed to various Internet-of-Things devices. As further shown in this figure, network connection monitoring device 404 is affixed to smart refrigerator 402, network connection monitoring device 408 is affixed to smart weight scale 406, and a network connection monitoring device 412 is affixed to smart digital camera 410. Notably, the network connection monitoring device may be affixed using any suitable affixing mechanism, such as a magnet or adhesive.

Optionally, in other examples, a user may simply place the network connection monitoring device adjacent, or in proximity, to the corresponding appliance. For example, a user may place the network connection monitoring device sufficiently close to the corresponding appliance to trigger selection of the wireless network connection (e.g., such that a signal strength of the wireless network connection becomes strong enough to satisfy a similarity threshold to an expected signal strength, or such that the signal strength of the wireless network connection becomes stronger than the signal strength of other detected wireless network connections, as further described above).

In further embodiments, selection module 106 may automatically select the wireless network connection as the wireless network connection to be evaluated in the analysis of network connection security at least in part by comparing the signal strength of the wireless network connection with the expected signal strength. In these examples, selection module 106 may reference data describing expected signal strengths, such as data stored according to signal strength modules 124, as described above. Selection module 106 may compare the signal strength of the wireless network connection with the expected signal strength either with, or without, information indicating a model, type, and/or brand of the corresponding appliance. Without knowledge of the model, type, and/or brand of the corresponding appliance, selection module 106 may simply compare the detected signal strength with a signal strength that is expected from a conventional or generic wireless network radio at a corresponding distance or location (e.g., at the minimal distance corresponding to the network connection monitoring device being affixed to the appliance).

In other examples, selection module 106 may have at least some information about the model, type, and/or brand of the corresponding appliance. Selection module 106 may obtain this information from observing the corresponding appliance (e.g., through a camera or microphone), from user input (e.g., through the minimal user interface described above, or from a more robust interface), and/or from sniffing the corresponding wireless network connection. For example, a camera of the network connection monitoring device may observe a sticker, model number, product code, QRF code, and/or bar code and thereby extract information about the corresponding model, type, and/or brand of the appliance. In the case of sniffing the wireless network connection, if the wireless network connection is unencrypted or otherwise susceptible to decryption, either partially or entirely, selection module 106 may extract one or more items of information about the model, type, and/or brand of the corresponding appliance from one or more network packets transmitted from, or transmitted to, the corresponding appliance. In any of these cases, selection module 106 may use the extracted information to query an internal or external database for information that further describes, or indicates, an expected signal strength for that specific model, type, and/or brand. In some examples, the expected signal strength and/or database may be stored on a cloud-based server of a security vendor to which the network connection monitoring device has connectivity (e.g., through the Internet).

In further examples, selection module 106 may automatically select the wireless network connection as the wireless network connection to be evaluated in the analysis of network connection security at least in part by comparing the signal strength of the wireless network connection to a signal strength of the other detected wireless network connection. For example, selection module 106 may determine that the signal strength of the selected wireless network connection is greater than the signal strength of the other detected wireless network connection. In the case that both of these wireless network connections are presumed to be generic or roughly equivalent (e.g., in the case of lacking more specific information about the model, type, and/or brand of either or both of these appliances, or lacking information about the corresponding signal strength of these appliances), selection module 106 may determine that the signal strength of the selected wireless network connection is greater than the signal strength of the other wireless network connection, thereby further indicating that the appliance corresponding to the selected wireless network connection is presumably closer to the network connection monitoring device, and therefore the appliance intended by a user as a target for monitoring (e.g., in the case that the user affixes the network connection monitoring device to that specific appliance thereby minimizing the distance between these two items and generating a strong signal strength for the wireless network connection).

Alternatively, in the case that the network connection monitoring device has extracted information about the model, type, and/or brand of either or both of these appliances, then selection module 106 may modulate the comparison between the two signal strengths based on one or more expected signal strengths, such that a weaker signal strength may still indicate closer proximity if the weaker signal strength corresponds to an appliance that is expected to have a significantly weaker signal strength than the other appliance. In other words, selection module 106 may effectively weight, or modulate, the comparison between the two signal strengths based on one or more items of information indicating at least one expected signal strength, as further described above.

In further examples, selection module 106 may determine that the signal strength of the wireless network connection is stronger by determining that the signal strength is strongest among a set of all detected wireless network connections. For example, in the case of FIG. 4, selection module 106, when located at network connection monitoring device 404, may determine that the signal strength of the wireless network connection between smart refrigerator 402 and a corresponding wireless router is stronger than both of the wireless network connection signal strengths associated with smart weight scale 406 and smart digital camera 410, as further discussed above.

Returning to FIG. 3, at step 306, one or more of the systems described herein may perform, in response to the automatic selecting of the wireless network connection as the wireless network connection to be evaluated, the analysis of network connection security to determine whether the wireless network connection is secure. For example, performance module 108 may, as part of computing device 202 in FIG. 2, perform, in response to the automatic selecting of wireless network connection 280 as the wireless network connection to be evaluated, the analysis of network connection security to determine whether wireless network connection 280 is secure. Notably, as used herein, the phrase "perform the analysis of network connection security to determine whether the wireless network connection is secure" generally refers to performing the analysis in a manner that generates a conclusion or indication of whether the wireless network connection is secure, as discussed further below.

Performance module 108 may perform the analysis in a variety of ways. In some examples, performance module 108 may perform the analysis of network connection security to determine whether the wireless network connection is secure by determining whether the wireless network connection uses an unencrypted channel. For example, performance module 108 may determine that the wireless network connection uses a hypertext transfer protocol connection rather than a hypertext transfer protocol secure connection (i.e., uses HTTP rather than HTTPS). Additionally, or alternatively, performance module 108 may perform the analysis of network connection security by determining whether the wireless network connection uses an encrypted channel that is encrypted according to a network protocol that had been previously categorized, at the computing device, as weak encryption. In these examples, performance module 108 may determine that the wireless network connection is encrypted, through Secure Sockets Layer and/or Transfer Layer Security protocols according to an encryption method that is previously categorized as weak (e.g., MD5 and/or RC4 encryption). Similarly, in these examples, performance module 108 may determine that the wireless network connection has not established a proper chain of validation.

In additional or alternative examples, performance module 108 may perform the analysis of network connection security to determine whether the wireless network connection is secure by determining whether the wireless network connection uses a security certificate that is expired and/or self-signed. Additionally or alternatively, performance module 108 may perform the analysis of network connection security by determining whether entropy on the wireless network connection has been validated. In these examples, a secure or correctly encrypted channel should indicate randomness, or appear to be random, to an outside observer. Unencrypted, or poorly encrypted channels, will have non-even byte distribution. For example, if textual information is transmitted, bytes matching ASCII codes of the English alphabet are more likely to be present according to a statistical measurement in the case that the channel is unsecure or poorly encrypted, as further discussed above.

Returning to FIG. 3, at step 308, one or more of the systems herein may automatically report, through a physical output of the computing device and in response to performing the analysis of network connection security, a result of the analysis of network connection security to inform a user about the safety of the Internet-of-Things device. For example, at step 304, reporting module 110 may automatically report, through a physical output of computing device 202 and in response to performing the analysis of network connection security, a result of the analysis of network connection security to inform a user about the safety of Internet-of-Things device 206.

Reporting module 110 may automatically report the result of the analysis in a variety of ways. In the example of FIG. 4, the network connection monitoring device, with a minimalist design, as described above, may simply display a color indicative of a result of the analysis. For example, the network connection monitoring device may be outfitted with a single light that is capable of glowing in two or more colors. In general, green may indicate safety, red may indicate danger, and "off" or dim may indicate a failure to detect, or select, a wireless network connection. More specifically, if the network connection monitoring device fails to detect a wireless network connection, or fails to select a detective wireless network connection (e.g., because the wireless network connection fails to satisfy a predefined policy in terms of signal strength, as further discussed above), then the light may fail to glow or otherwise remain dim or off.

In other examples, the network connection monitoring device may include two or more separate lights, and each of these lights may be specifically designed to display a single color. For example, one light that is designed to glow green may do so in response to detection of a secure connection. In contrast, a different light that is designed to glow red may do so in response to detection of an unsecure connection.

In further examples, the network connection monitoring device may include a single LCD display, text display, and/or screen. In general, the display may indicate a result of the analysis through a corresponding color, as discussed above, or through a text or graphical user interface, which may include further details and information about the result of the analysis. Additionally, or alternatively, the network connection monitoring device may output part or all of the result of the analysis in the form of audio or voice output.

Figure 5:
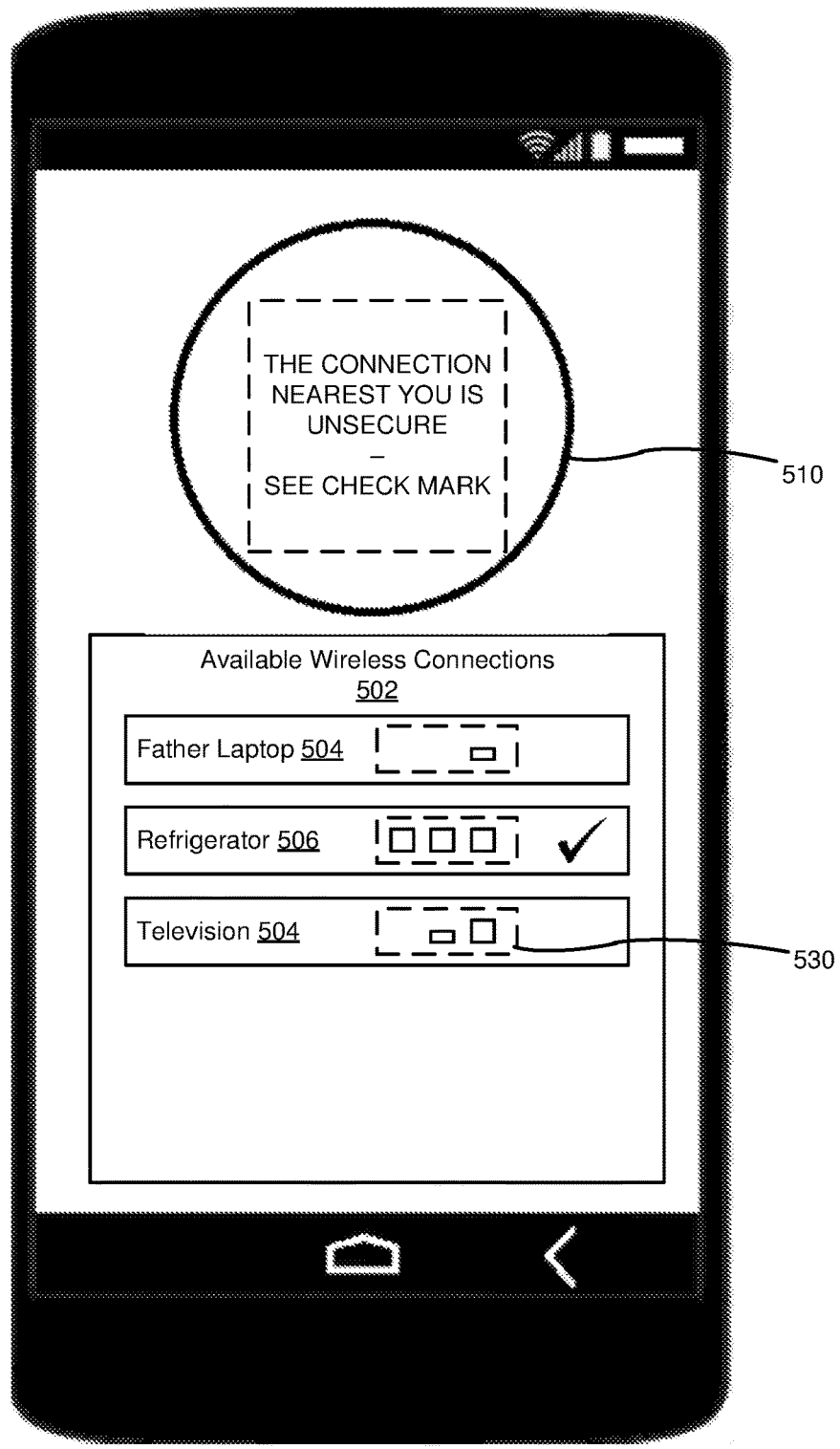
FIG. 5 is a block diagram of an example graphical user interface for a smart phone.

FIG. 5 shows an additional example of how reporting module 110 may report the result of the analysis of network connection security. As further shown in this figure, a smart phone may be equipped with an application that performs method 300, as further described above, and also discussed further below. The graphical user interface of the smart phone may include a list of available wireless connections 502. The list of available wireless connections 502 may indicate a wireless network connection for "father laptop" 504, "refrigerator" 506, and "television" 504. Each of these may correspond to an Internet-enabled appliance, smart appliance, Internet-of-Things device, and/or other Internet-enabled device that has established a wireless network connection (or is attempting to establish a wireless network connection) with a home router. From among these wireless network connections that have been detected by the smart phone, "refrigerator" 506 has been selected, as indicated by the checkmark shown within the graphical user interface in FIG. 5. This particular wireless network connection has been selected by selection module 106 based on the comparison between the signal strength for the wireless network connection and an expected signal strength and/or a strength for one or more other detected wireless network connections (e.g., the signal strengths for the other wireless network connections shown within the list of available wireless connections 502), as further discussed above.

In general, selection module 106 may effectively map a larger number of wireless network connections to a smaller number of safety display indications (e.g., a single display indication). The safety display indication may include any of the lights or visual displays discussed above regarding FIG. 4, as well as the visual, color display 510, which is a portion of the graphical user interface within the smart phone of FIG. 5. In one illustrative embodiment, method 300 is performed with only a single available safety display indication, such as the visual, color display 510. As further shown in this figure, the smart phone may also display a series of "bars" 530 to indicate signal strength. Of course, the smart phone and application may also use any alternative, suitable symbol or text to indicate signal strength. In this specific example, smart refrigerator 506 shows the most signal strength and, consequently, the most "bars." Additionally, visual, color display 510 further includes an optional text indication "THE CONNECTION NEAREST YOU IS UNSECURE—SEE CHECK MARK," which overlays the (red) color indication of a safety risk.

Notably, the minimal number of safety display indications, such as a single safety display indication, as in FIG. 5, renders the network connection monitoring device or smart phone more streamlined, convenient, and user-friendly for non-expert users, as discussed above, due to the minimalist design. In essence, the single safety display indication allows the user to rove around, as with a Geiger counter or metal detector, and conveniently detect secure and unsecure connections in a streamlined and user-friendly manner. Nevertheless, the smaller number of safety display indications requires or involves selection module 106 to select a specific wireless network connection when a multitude of wireless network connections are detected, as in the case of FIG. 4 and FIG. 5. In view of the above, selection module 106 effectively performs the operation of mapping a single wireless network connection from a multitude of detected wireless network connections to a single safety display indication, thereby overcoming the problem, in the context of a streamlined and minimalist-designed network connection monitoring device, of having fewer safety display indications available than wireless network connections that are detected. Selection module 106 solves the problem by selecting a specific detected wireless network connection on the basis of proximity and/or signal strength, as further discussed above.

In a specific example, selection module 106 selects the specific detected wireless network connection based on the signal strength of the wireless network connection being stronger than signal strengths for other detected wireless network connections, which is consistent with the smart phone or network connection monitoring device being affixed to the corresponding appliance, or otherwise closer in proximity to the corresponding appliance, thereby indicating that the user is targeting that specific appliance for analysis, as further discussed above. In related examples selection module 106 may select the specific detected wireless network connection based on the signal strength of the wireless network connection satisfying a predetermined threshold that is configured or defined to indicate an exceptionally strong signal strength, consistent with the smart phone being adjacent, of affixed, to the target appliance.

In general, reporting module 110 may provide a text notification, pop up, alert, signal, light, and/or other indication of the result of the analysis. Additionally, or alternatively, reporting module 110 may also perform another security action autonomously, or after prompting and receiving confirmation from a human user. The security action may include sending a notification, such as an email, text message, network message, pop-up message, message board message, or other notification. The security action may also include heightening or enabling one or more security settings, disabling or quarantining the appliance under evaluation, powering down the appliance under evaluation, breaking the wireless network connection through interference or communication with the appliance in coordination with the router, and/or any other suitable security action to protect a user from an unsecure wireless network connection.

Modules 102, in coordination with a human user, may also establish more granular policies for evaluating wireless network connections, as discussed above. For example, a user may interact with a graphical user interface of a web interface, and/or interact with a user interface of the network connection monitoring device, to establish rules, settings, and/or policies that may be wireless network connection-specific or appliance-specific. For example, the user may establish more restrictive settings for more security-sensitive appliances, such as a home security system, than other, less security-sensitive appliances, such as a refrigerator. More specifically, the user may allow for a smart refrigerator to download recipes through an unsecure channel, while refusing to allow a home security system to establish or communicate through an unsecure channel. In other examples, these more granular policies may be default or predefined within the network connection monitoring device product or smart phone application, as discussed further above.

Figure 6:
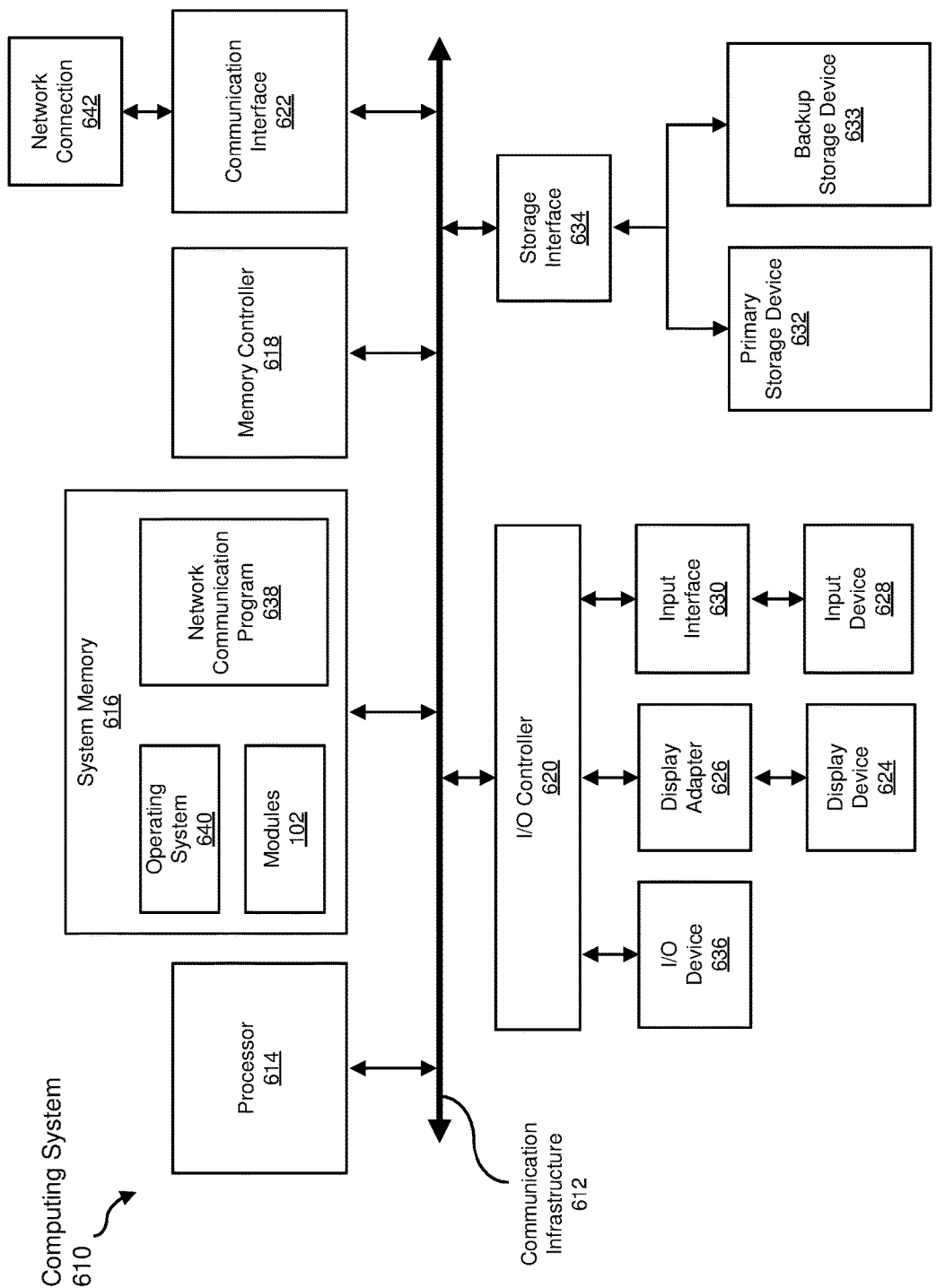
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O)

controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
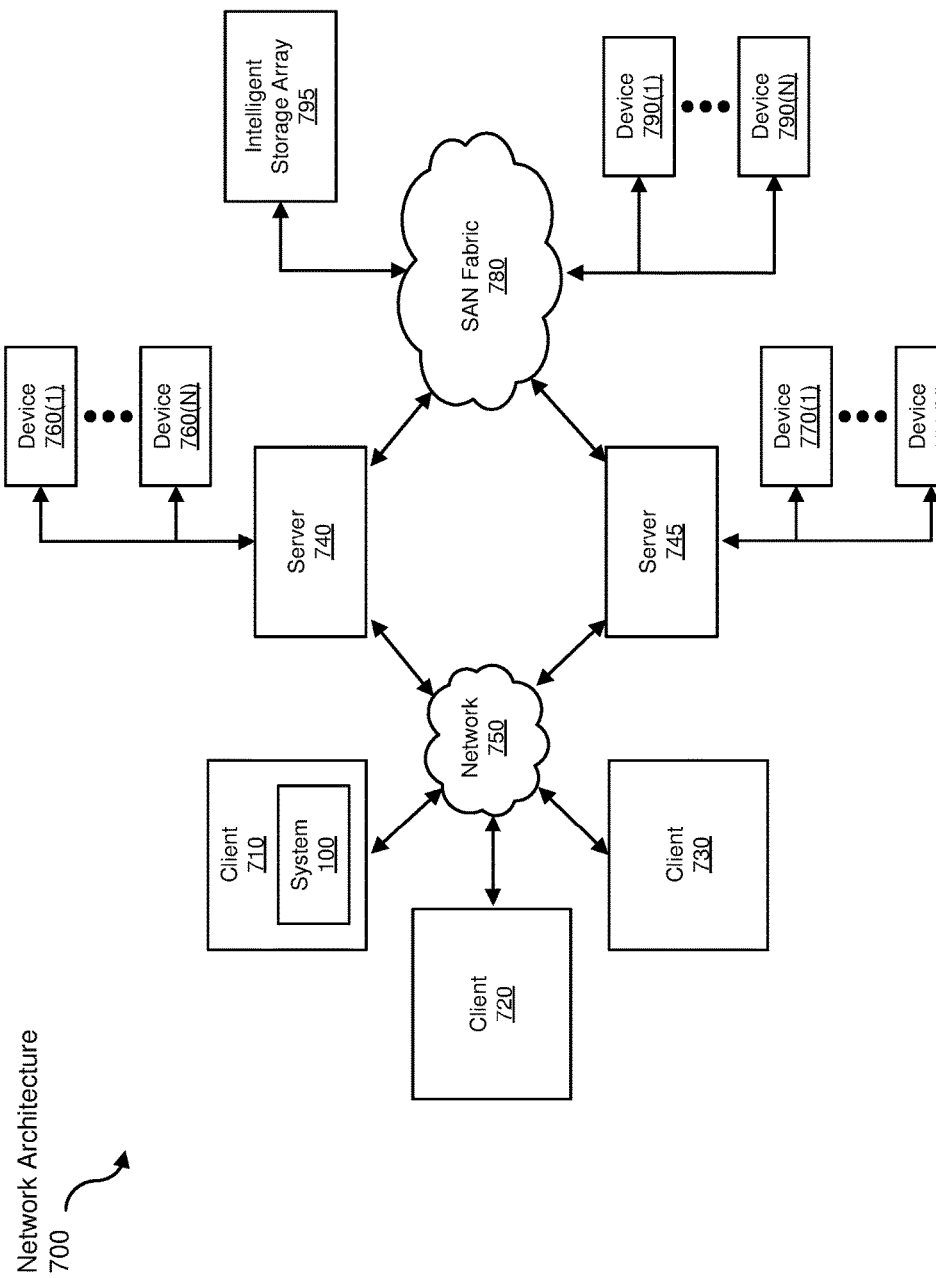
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for evaluating wireless network connection security.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may transform a colored light indication from one color state to another state, and/or transform corresponding data structures and setting values, in accordance with method 300, as described above, to thereby provide the concrete benefit of informing a user about the safety and/or security risk associated with a network connection, in a convenient and streamlined manner, while also optionally performing one or more additional security functions (or enabling the user to perform these additional security functions) to further protect the user from associated security risks, as further described above. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for evaluating wireless network connection security, at least a portion of the method being performed by a computing device comprising at least one processor, the method comprising:
    detecting, by a monitoring device, a wireless network connection from an Internet-of-Things device through sniffing, wherein the monitoring device is affixed to a surface of the Internet-of-Things device;
    automatically selecting the wireless network connection as the wireless network connection to be evaluated in an analysis of network connection security by at least one of comparing a signal strength of the wireless network connection with an expected signal strength and comparing the signal strength of the wireless network connection to a signal strength of another detected wireless network connection;
    performing, in response to the automatic selecting of the wireless network connection as the wireless network connection to be evaluated, the analysis of network connection security to determine whether the wireless network connection is secure; and
    automatically reporting, through a physical output of the computing device and in response to performing the analysis of network connection security, a result of the analysis of network connection security to inform a user about safety of the Internet-of-Things device.

2. The computer-implemented method of claim 1, wherein the Internet-of-Things device comprises at least one of:
    a refrigerator;
    a thermostat;
    a scale;
    a camera; and
    a household security system.

3. The computer-implemented method of claim 1, wherein automatically selecting the wireless network connection as the wireless network connection to be evaluated in an analysis of network connection security is performed while the monitoring device is affixed to the Internet-of-Things device.

4. The computer-implemented method of claim 1, wherein automatically selecting the wireless network connection as the wireless network connection to be evaluated in the analysis of network connection security comprises comparing the signal strength of the wireless network connection with the expected signal strength.

5. The computer-implemented method of claim 1, wherein automatically selecting the wireless network connection as the wireless network connection to be evaluated in the analysis of network connection security comprises comparing the signal strength of the wireless network connection to a signal strength of the other detected wireless network connection.

6. The computer-implemented method of claim 5, wherein comparing the signal strength of the wireless network connection to the signal strength of the other detected wireless network connection comprises determining that the signal strength of the wireless network connection is stronger.

7. The computer-implemented method of claim 1, wherein determining that the signal strength of the wireless network connection is stronger comprises determining that the signal strength is strongest among a set of all detected wireless network connections.

8. The computer-implemented method of claim 1, wherein performing the analysis of network connection security to determine whether the wireless network connection is secure comprises at least one of:
    determining whether the wireless network connection uses an unencrypted channel;
    determining whether the wireless network connection uses an encrypted channel that is encrypted according to a network protocol that had been previously categorized, at the computing device, as weak encryption;
    determining whether the wireless network connection uses a security certificate that is at least one of expired and self-signed; and
    determining whether entropy on the wireless network connection has been validated.

9. The computer-implemented method of claim 1, wherein relative movement between the monitoring device and the Internet-of-Things device triggers the automatically selecting the wireless network connection as the wireless network connection to be evaluated in the analysis of network connection security.

10. The computer-implemented method of claim 1, wherein:

the computing device corresponds to a thumb-sized device with minimal functionality that is substantially limited to the analysis of network connection security; and the physical output of the computing device visually displays a color to indicate a level of security for the wireless network connection.

11. A system for evaluating wireless network connection security, the system comprising:

a computing device comprising at least one physical processor; and physical memory comprising computer-executable instructions that, when executed by the at least one physical processor, cause the computing device to:

detect, by a monitoring device, a wireless network connection from an Internet-of-Things device through sniffing, wherein the monitoring device is affixed to a surface of the Internet-of-Things device;

automatically select the wireless network connection as the wireless network connection to be evaluated in an analysis of network connection security by at least one of comparing a signal strength of the wireless network connection with an expected signal strength and comparing the signal strength of the wireless network connection to a signal strength of another detected wireless network connection;

perform, in response to the automatic selecting of the wireless network connection as the wireless network connection to be evaluated, the analysis of network connection security to determine whether the wireless network connection is secure; and automatically report, through a physical output of the computing device and in response to performing the analysis of network connection security, a result of the analysis of network connection security to inform a user about safety of the Internet-of-Things device.

12. The system of claim 11, wherein the Internet-of-Things device comprises at least one of:

a refrigerator;

a thermostat;

a scale;

a camera; and a household security system.

13. The system of claim 11, wherein the monitoring device is affixed to the Internet-of-Things device.

14. The system of claim 11, wherein the computer-executable instructions further cause the computing device to automatically select the wireless network connection as the wireless network connection to be evaluated in the analysis of network connection security at least in part by comparing the signal strength of the wireless network connection with the expected signal strength.

15. The system of claim 11, wherein the computer-executable instructions further cause the computing device to automatically select the wireless network connection as the wireless network connection to be evaluated in the analysis of network connection security by comparing the signal strength of the wireless network connection to a signal strength of the other detected wireless network connection.

16. The system of claim 15, wherein the computer-executable instructions further cause the computing device to compare the signal strength of the wireless network connection to the signal strength of the other detected wireless network connection by determining that the signal strength of the wireless network connection is stronger.

17. The system of claim 11, wherein the computer-executable instructions further cause the computing device to determine that the signal strength of the wireless network connection is stronger by determining that the signal strength is strongest among a set of all detected wireless network connections.

18. The system of claim 11, wherein, to perform the analysis of network connection security to determine whether the wireless network connection is secure, the computer-executable instructions further cause the computing device to at least one of:

determine whether the wireless network connection uses an unencrypted channel;

determine whether the wireless network connection uses an encrypted channel that is encrypted according to a network protocol that had been previously categorized, at the computing device, as weak encryption;

determine whether the wireless network connection uses a security certificate that is at least one of expired and self-signed; and determine whether entropy on the wireless network connection has been validated.

19. The system of claim 11, wherein relative movement between the monitoring device and the Internet-of-Things device will trigger the automatically selecting the wireless network connection as the wireless network connection to be evaluated in the analysis of network connection security.

20. A non-transitory computer-readable medium comprising one or more computer-readable instructions that, when executed by at least one processor of a computing device, cause the computing device to:

detect, by a monitoring device, a wireless network connection from an Internet-of-Things device through sniffing, wherein the monitoring device is affixed to a surface of the Internet-of-Things device;

automatically select the wireless network connection as the wireless network connection to be evaluated in an analysis of network connection security by at least one of comparing a signal strength of the wireless network connection with an expected signal strength and comparing the signal strength of the wireless network connection to a signal strength of another detected wireless network connection;

perform, in response to the automatic selecting of the wireless network connection as the wireless network connection to be evaluated, the analysis of network connection security to determine whether the wireless network connection is secure; and automatically report, through a physical output of the computing device and in response to performing the analysis of network connection security, a result of the analysis of network connection security to inform a user about safety of the Internet-of-Things device.

* * * * *